United States Patent [19]
Bacchi et al.

[11] Patent Number: 6,105,454
[45] Date of Patent: Aug. 22, 2000

[54] SINGLE AND DUAL END EFFECTOR, MULTIPLE LINK ROBOT ARM SYSTEMS HAVING TRIAXIAL DRIVE MOTORS

[75] Inventors: Paul Bacchi, Novato; Paul S. Filipski, Greenbrae, both of Calif.

[73] Assignee: Kensington Laboratories, Inc., Richmond, Calif.

[21] Appl. No.: 09/098,167

[22] Filed: Jun. 16, 1998

Related U.S. Application Data

[63] Continuation-in-part of application No. 08/500,489, Jul. 10, 1995, Pat. No. 5,765,444.

[51] Int. Cl.[7] .............................. G05G 11/00; B25J 17/00
[52] U.S. Cl. ..................................... 74/490.03; 414/744.5; 901/40
[58] Field of Search .............................. 414/744.5; 901/8, 901/15, 40; 74/490.03, 490.01, 490.05

[56] References Cited

U.S. PATENT DOCUMENTS

| | | | |
|---|---|---|---|
| 4,065,001 | 12/1977 | Ohnaka | 214/1 BV |
| 4,299,533 | 11/1981 | Ohnaka | 414/752 |
| 4,767,257 | 8/1988 | Kato | 414/744 A |
| 4,787,813 | 11/1988 | Stevens et al. | 414/744.5 |
| 4,813,846 | 3/1989 | Helms | 414/744.1 |
| 4,897,015 | 1/1990 | Abbe et al. | 414/744.8 |
| 5,007,784 | 4/1991 | Genov et al. | 414/225 |
| 5,064,340 | 11/1991 | Genov et al. | 414/744.5 |
| 5,102,280 | 4/1992 | Podjue et al. | 414/225 |
| 5,151,008 | 9/1992 | Ishida et al. | 414/744.5 |
| 5,314,294 | 5/1994 | Taniguchi et al. | 414/744.6 |
| 5,513,946 | 5/1996 | Sawada et al. | 414/744.5 |
| 5,584,647 | 12/1996 | Uehara et al. | 414/744.5 |
| 5,794,487 | 8/1998 | Solomon et al. | 74/490.03 |

OTHER PUBLICATIONS

Data Sheet for Kensington Laboratories WH–3 Wafer Handler Robot Mechanism (1986).
Drawing figure showing motor arrangement implemented in WH–3 mechanism. No Date Available.

*Primary Examiner*—David M. Fenstermacher
*Attorney, Agent, or Firm*—Stoel Rives LLP

[57] ABSTRACT

A robot arm system (8) includes a multiple link robot arm mechanism (10) mounted at a shoulder axis (16) to a torso link (12) that is capable of 360-degree rotation about a torso axis (14). The robot arm mechanism couples an upper arm (15) and a forearm (22) to a hand (30) that is capable of linear or radial motion relative to the shoulder axis. The robot arm system minimizes its moment of inertia by arranging first (50), second (52), and third (92) motors triaxially about the torso axis to permit rapid movement of the hand. The first motor is coupled through endless belts (55, 68) to rotate the forearm about an elbow axis (24), the second motor is coupled through an endless belt (74) to rotate the upper arm about the shoulder axis, and the third motor rotates the torso link about the torso axis. A motor controller (100) operates in at least three operational states. The first operational state maintains the position of the third motor and equally counter-rotates the first and second motors to cause linear extension or retraction of the hand. The second operational state equally rotates the first and second motors and maintains the position of the third motor to cause angular displacement of the hand about the shoulder axis. The third operational state equally rotates the first, second, and third motors so that the robot arm mechanism undergoes angular displacement about the torso axis. Coordinating the rotations of the first and second motors enables the robot arm mechanism to describe a compound curvilinear travel path for the hand. The rotatable torso link together with the robot arm motion permits simple, nonradial positioning of specimen processing stations (350) relative to the torso axis, extended hand reach, and corner reacharound capabilities. The consequence is a high-speed, high-throughput robot arm system that operates in a compact work space.

19 Claims, 8 Drawing Sheets

SINGLE AND DUAL END EFFECTOR, MULTIPLE LINK ROBOT ARM SYSTEMS HAVING TRIAXIAL DRIVE MOTORS

RELATED APPLICATIONS

This application is a continuation-in-part of U.S. patent application Ser. No. 08/500,489. filed Jul. 10. 1995, for DUAL END EFFECTOR, MULTIPLE LINK ROBOT ARM SYSTEM WITH CORNER REACHAROUND AND EXTENDED REACH CAPABILITIES now U.S. Pat. No. 5,765,444.

TECHNICAL FIELD

This invention relates to robot arm mechanisms and, in particular, to a continuously rotatable multiple link robot arm system employing a triaxial drive motor configuration to improve the positioning performance of the robot arm corner reacharound and extended reach capabilities.

BACKGROUND OF THE INVENTION

Currently available robot arm mechanisms include pivotally joined multiple links that are driven by a first motor and are mechanically coupled to effect straight line movement of an end effector or hand and are equipped with a second motor to angularly displace the hand about a central axis. Certain robot arm mechanisms are equipped with telescoping mechanisms that move the hand also in a direction perpendicular to the plane of straight line movement and angular displacement of the hand. The hand is provided with a vacuum outlet that secures a specimen, such as a semiconductor wafer, computer hard disk, or compact disk, to the hand as it transports the specimen between processing stations.

U.S. Pat. No. 4,897,015 of Abbe et al. describes a rotary-to-linear motion robot arm that uses a first motor to control a multiple link robot arm to produce straight line radial motion from motor-driven rotary motion. An additional motor may be coupled to the robot arm for operation independent of that of the first motor to angularly move the multiple link robot arm without radial motion. Because they independently produce radial motion and angular motion, the first and second motors produce useful robot arm movement when either one of them is operating.

The robot arm of the Abbe et al. patent extends and retracts an end effector (or a hand) along a straight line path by means of a mechanism that pivotally couples in a fixed relationship a first arm (or forearm) and a second (or upper) arm so that they move in predetermined directions in response to rotation of the upper arm. To achieve angular displacement of the hand, a third drive motor rotates the entire robot arm structure. The Abbe et al. patent describes no capability of the robot arm to reach around corners or travel along any path other than a straight line or a circular segment defined by a fixed radius.

U.S. Pat. No. 5,007,784 of Genov et al. describes a robot arm with an end effector structure that has two oppositely extending hands, each of which is capable of picking up and transporting a specimen. The end effector structure has a central portion that is centrally pivotally mounted about the distal end of a second link or forearm. The extent of pivotal movement about all pivot axes is purposefully limited to prevent damage to vacuum pressure flexible conduits resulting from kinking or twisting caused by over-rotation in a single direction.

The coupling mechanism of a first link or upper arm, the forearm, and the end effector structure of the robot arm of the Genov et al. patent is more complex than that of the robot arm of the Abbe et al. patent. Nevertheless, the robot arm structures of the Abbe et al. and Genov et al. patents operate similarly in that each of the end effector structures picks up and transports specimens by using one motor to extend and retract a hand and another, different motor to rotate the entire robot arm structure to allow the hand to extend and retract at different ones of a restricted number of angular positions.

Robot arms of the type described by the Abbe et al. and Genov et al. patents secure a specimen to the hand by means of vacuum pressure delivered to the hand through fluid conduits extending through the upper arm, forearm, and hand and around all of the pivot axes. The Abbe et al. patent is silent about a vacuum pressure delivery system, and the Genov et al. patent describes the use of flexible fluid conduits. The presence of flexible fluid conduits limits robot arm travel path planning because unidirectional robot arm link rotation about the pivot axes "winds up" the conduits and eventually causes them to break. Thus, conduit breakage prevention requirements prohibit continuous robot arm rotation about any of the pivot axes and necessitate rewind maneuvers and travel path "lockout" spaces as part of robot arm travel path planning. The consequences of such rewind maneuvers are more complex and limited travel path planning, reduced throughput resulting from rewind time, and reduced available work space because of the lockout spaces.

Moreover, subject to lockout space constraints, commercial embodiments of such robot arms have delivered specimens to and retrieve specimens from stations angularly positioned about paths defined only by radial distances from the axes of rotation of the robot arms.

Thus, the robot arm structures described by the Abbe et al. and Genov et al. patents are incapable of transporting specimens between processing stations positioned in compact, irregularly shaped work spaces. For example, neither of these robot arm structures is set up to remove or place specimen wafers in wafer cassettes that have openings positioned side-by-side in a straight line arrangement of a tightly packed work space.

A solution to the above-described problems is described in allowed U.S. patent application Ser. No. 5,765,444, filed Jul. 10, 1995, for DUAL END EFFECTOR, MULTIPLE LINK ROBOT ARM SYSTEM WITH CORNER REACHAROUND AND EXTENDED REACH CAPABILITIES, which is assigned to the assignee of this application and is incorporated herein by reference. A multiple link robot arm mechanism is mounted at the distal end of a torso link that is capable of 360-degree rotation about a central, or "torso," axis. Two coaxially arranged motors mounted at the distal end of the torso link are capable of synchronized operation that moves a robot arm hand along a curvilinear path as the extension of the hand changes. A first motor rotates a forearm about an elbow axis that extends through distal and proximal ends of the upper arm and forearm, respectively, and a second motor rotates an upper arm about a shoulder axis that extends through a proximal end of the upper arm. A mechanical linkage couples the upper arm and the forearm. The mechanical linkage forms an active drive link and a passive drive link. The active drive link operatively connects the first motor and the forearm to cause the forearm to rotate about the elbow axis in response to the first motor. The passive drive link operatively connects the forearm and the hand to cause the hand to rotate about a wrist axis in response to rotation of the forearm about the elbow axis. The wrist axis extends through distal and proximal ends of the forearm and hand, respectively.

Whenever the first and second motors move equal angular distances, the angular displacement of the upper arm about the shoulder axis and the angular displacement of the forearm about the elbow axis equally offset and thereby result in only a net angular displacement of the hand about the shoulder axis. Thus, under these conditions, there is no linear displacement of the hand and no rotation of the hand about the wrist axis. Whenever the first and second motors move different angular distances, the angular displacement of the upper arm about the shoulder axis and the angular displacement of the forearm about the elbow axis only partly offset and thereby result in angular displacements of the hand about the shoulder and wrist axes and a linear displacement of the hand. Accordingly, coordination of the position control of the first and second motors enables the robot arm mechanism to describe a compound curvilinear path of travel for the hand.

A third, or torso, motor rotates the torso link about the central axis to permit rotation of the torso link independent of the motion of the robot arm mechanism mounted to it. The presence of the rotatable torso link together with the independent robot arm motion permits simple, nonradial positioning of specimen processing stations relative to the torso axis, extended paddle reach, and corner reacharound capabilities. Moreover, the rotating joints of the robot arm mechanism include rotary vacuum slip rings that permit continuous rotation about the shoulder, elbow, and wrist axes without a need to unwind to prevent kinking or twisting of vacuum lines.

Unfortunately, mounting the first and second motors at the distal end of the torso link creates a relatively high moment of inertia for the torso motor to work against. The moment of inertia may be reduced by making the first and second motors as small and as light as possible, but this limits their torque and the rate at which the robot arm can rotationally move specimens.

What is needed, therefore, is a continuously rotatable robot arm mechanism that is capable of accurately and rapidly moving large specimens along compound curvilinear paths.

SUMMARY OF THE INVENTION

An object of the invention is, therefore, to provide a multiple link robot arm system that has straight line motion, extended reach, corner reacharound, and continuous bidirectional rotation capabilities for transporting specimens to virtually any location in an available work space that is free of lockout spaces.

Another object of the invention is to provide such a system that increases specimen positioning speed, distance, and accuracy.

A further object of the invention is to provide such a system that uses a drive motor arrangement that is capable of high torque, synchronous operation and a linkage coupling mechanism that permit a hand of an end effector structure to change its extension as the multiple link robot arm mechanism to which the hand is associated changes its angular position.

This invention includes a multiple link robot arm mechanism mounted at the distal end of a torso link that is capable of 360-degree rotation about a torso axis. The robot arm mechanism includes an end effector having a single-ended hand, or alternatively, two oppositely extending hands. The multiple link robot arm mechanism minimizes its moment of inertia by arranging first, second, and third high torque motors in a triaxial concentric relationship about the torso axis to permit rapid movement of the robot arm hand along a curvilinear path as the extension of the hand changes. The first motor is coupled through a 1:1 ratio endless belt drive system to rotate a forearm about an elbow axis that extends through distal and proximal ends of an upper arm and forearm, respectively. The second motor is coupled through another 1:1 ratio endless belt drive system to rotate an upper arm about a shoulder axis that extends through a proximal end of the upper arm. A mechanical linkage coupling the upper arm and the forearm forms an active drive link and a passive drive link. The active drive link operatively connects the first motor and the forearm to cause the forearm to rotate about the elbow axis in response to the first motor. The passive drive link operatively connects the forearm and the hand to cause the hand to rotate about a wrist axis in response to rotation of the forearm about the elbow axis. The wrist axis extends through distal and proximal ends of the forearm and hand, respectively.

The third, or torso, motor rotates the torso link about the central axis, which extends through the center of the torso link.

A motor controller controls the first, second, and third motors in at least three preferred operational states to enable the robot arm mechanism to perform three principal motion sequences. The first operational state maintains the position of the third motor and equally counter-rotates the first and second motors so that the mechanical linkage causes linear displacement (i.e., extension or retraction) of the hand. The second operational state equally rotates the first and second motors and maintains the position of the third motor so that the mechanical linkage causes angular displacement of the hand about the shoulder axis. A variation of the second operational state can provide an indefinite number of travel paths for the hand, depending on coordination of the rotational control of the first and second motors. The third operational state equally rotates the first, second, and third motors so that the torso link and the robot arm mechanism together undergo angular displacement about the torso axis without linear displacement of the hand.

Whenever the first and second motors move equal angular distances, the angular displacement of the upper arm about the shoulder axis and the angular displacement of the forearm about the elbow axis equally offset and thereby result in only a net angular displacement of the hand about the shoulder axis. Thus, under these conditions, there is no linear displacement of the hand and no rotation of the hand about the wrist axis.

Whenever the first and second motors move different angular distances, the angular displacement of the upper arm about the shoulder axis and the angular displacement of the forearm about the elbow axis only partly offset and thereby result in angular displacements of the hand about the shoulder and wrist axes and consequently a linear displacement of the hand. Coordination of the position control of the first and second motors enables the robot arm mechanism to describe a compound curvilinear path of travel for the hand.

The third motor rotates the torso link about the torso axis. Whenever the motor controller synchronously rotates the first, second, and third motors through equal angular distances, the robot arm mechanism and the torso link corotate about the torso axis. The motor controller also permits independent operation of the third motor to permit rotation of the torso link independent of the motion of the robot arm mechanism or mechanisms mounted to it. The presence of the rotatable torso link together with the independent robot arm motion permits simple, nonradial positioning of specimen processing stations relative to the torso axis, extended paddle reach, and corner reacharound capabilities. The consequence is a highspeed, high-throughput robot arm system that operates in a compact work space.

The robot arm mechanism is equipped with rotary fluid multiple-passageway spools that deliver fluid pressure to the hand or hands through each rotary joint of the torso link and robot arm mechanism, thereby permitting continuous rotation of the torso and robot arm links about the torso, shoulder, elbow, and wrist axes.

Additional objects and advantages of this invention will be apparent from the following detailed description of preferred embodiments thereof, which proceeds with reference to the accompanying drawings.

DETAILED DESCRIPTION OF PREFERRED EMBODIMENTS

Figure 1A:
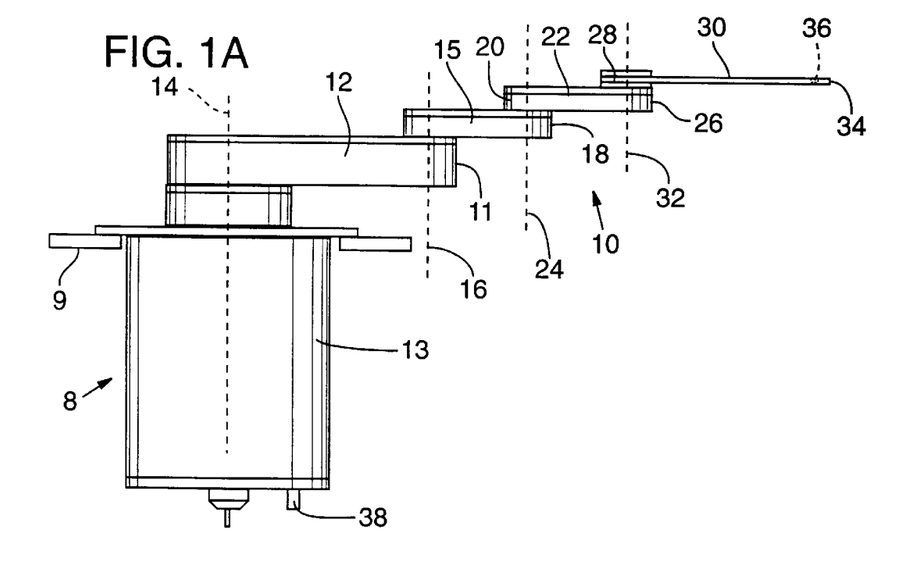
FIGS. 1A and 1B are respective side elevation and plan views of a multiple link robot arm system of the present invention, the robot arm system having an end effector with a single hand.
Figures 1B, 1C:
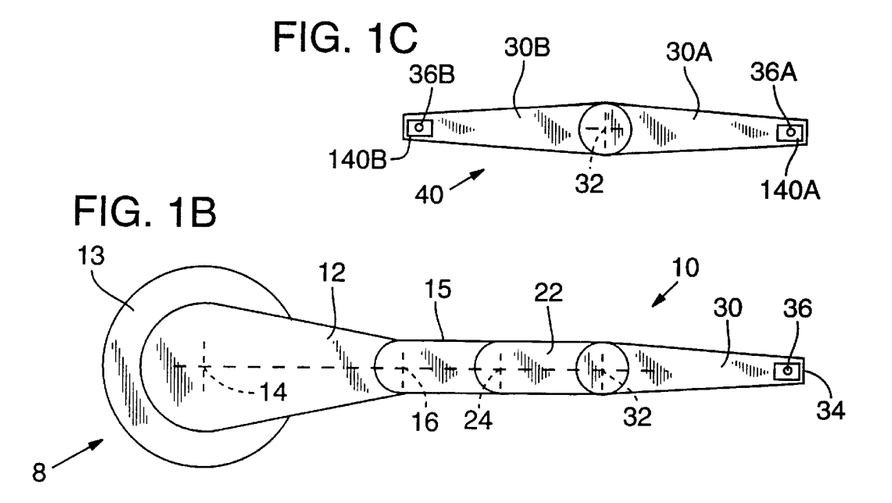
FIG. 1C is a plan view of an alternative end effector structure having two oppositely extending hands.

FIGS. 1A and 1B are respective side elevation and plan views of a multiple link robot arm system 8 mounted on and through an aperture in the top surface of a support table 9. A three-link robot arm mechanism 10 is rotatably mounted at a distal end 11 of a torso link 12, which is mounted to the top surface of a base housing 13 for rotation about a central or torso axis 14.

Robot arm mechanism 10 includes an upper arm 15 mounted on top of distal end 11 of torso link 12 for rotation about a shoulder axis 16. Upper arm 15 has a distal end 18 to which a proximal end 20 of a forearm 22 is mounted for rotation about an elbow axis 24, and forearm 22 has a distal end 26 to which a proximal end 28 of a hand 30 is mounted for rotation about a wrist axis 32. Hand 30 is equipped at a distal end 34 with a fluid pressure outlet 36 that preferably applies vacuum pressure supplied to robot arm mechanism 10 at an inlet 38 to securely hold a semiconductor wafer, compact disk, or other suitable specimen (not shown) in place on hand 30. As will be described in detail later, each of torso link 12, upper arm 15, forearm 22, and hand 30 is capable of continuous rotation about its respective torso axis 14, shoulder axis 16, elbow axis 24, and wrist axis 32.

FIG. 1C shows an alternative end effector structure 40 that includes oppositely extending hands 30A and 30B that rotate about wrist axis 32. Because they retrieve and deliver separate specimens, each of hands 30A and 30B has a fluid pressure outlet 36A and 36B respectively that are connected to separate fluid pressure conduits routed within base housing 13, torso link 12, upper arm 15, and forearm 22.

Figure 2:
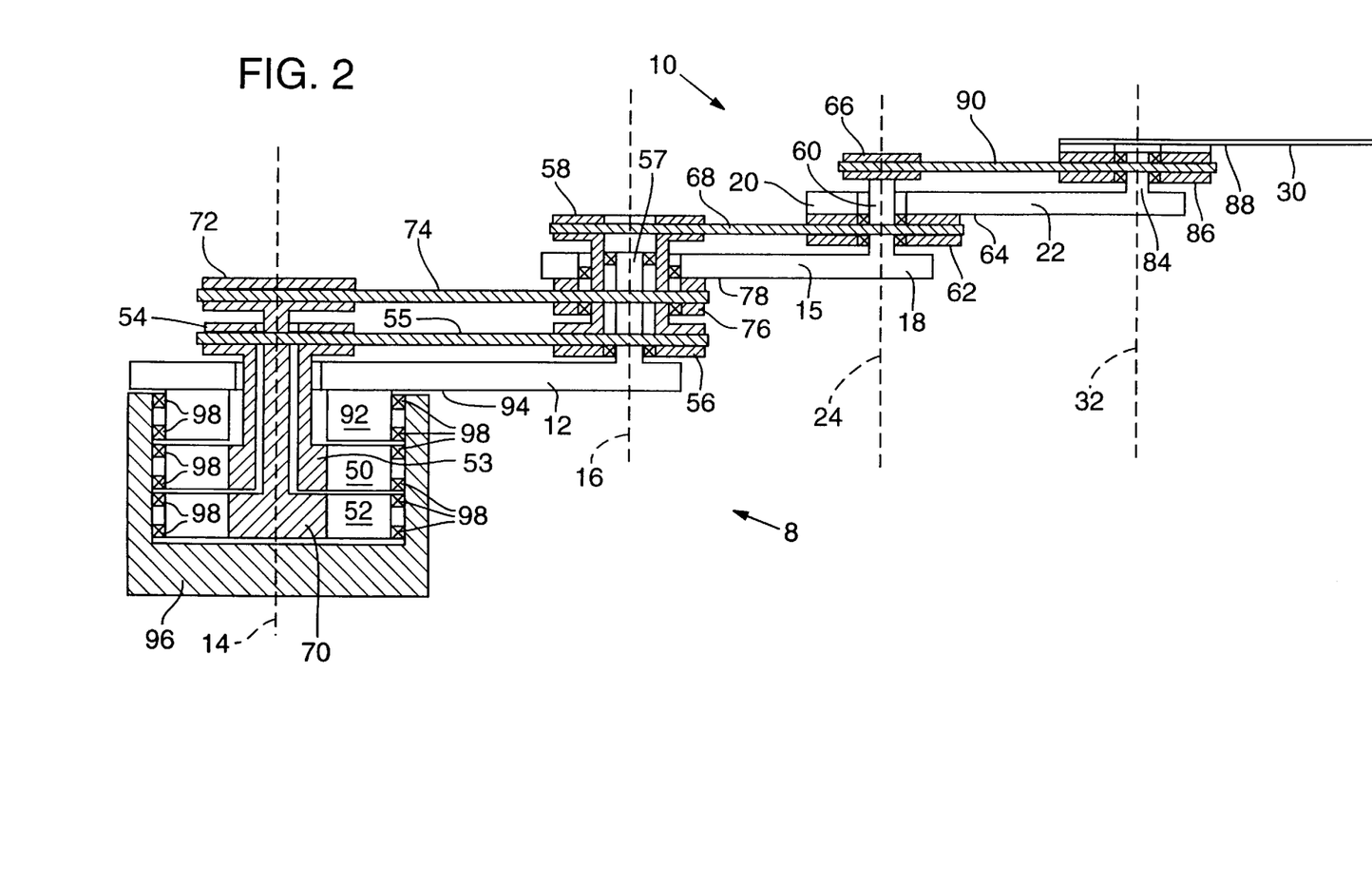
FIG. 2 is a side elevation view in conceptual stick diagram form showing the motors, link components, and associated mechanical linkages of the robot arm system of FIGS. 1A and 1B.

FIG. 2 shows the link components and associated mechanical linkage of multiple link robot arm system 8. Robot arm mechanism 10 is positioned through endless belt drive systems coupled to first and second concentric motors 50 and 52 that operate in response to commands provided by a motor controller 100, which is described with reference to FIGS. 3 and 7. First motor 50 is coupled to rotate forearm 22 about elbow axis 24, and second motor 52 is coupled to rotate upper arm 15 about shoulder axis 16.

More specifically, first motor 50 rotates a hollow first spindle 53 that extends through an aperture in torso link 12 and terminates in a first drive pulley 54. First drive pulley 54 is coupled in a 1:1 ratio by an endless belt 55 to a hollow forearm drive spindle 56 that rotates freely about a post 57 that is attached at shoulder axis 16 to torso link 12. Hollow forearm drive spindle 56 extends through an aperture in upper arm 15 and terminates in a forearm drive pulley 58. A post 60 extends upwardly along elbow axis 24 at distal end 18 of upper arm 15 and through the center of a forearm pulley 62 that is mounted to a bottom surface 64 of forearm 22 at its proximal end 20. Post 60 also extends through an aperture in forearm 22 and terminates in a hand drive pulley 66. An endless belt 68 connects in a 1:1 ratio forearm drive pulley 58 and forearm pulley 62 to rotate forearm 22 about elbow axis 24 in response to rotation of first motor 50.

Second motor 52 rotates a second spindle 70 that extends coaxially through the center of hollow first spindle 53 and terminates in a second drive pulley 72. Second drive pulley 72 is coupled in a 1:1 ratio by an endless belt 74 to a hollow upper arm pulley 76 that rotates freely about hollow forearm drive spindle 56. Hollow upper arm pulley 76 is mounted to a bottom surface 78 of upper arm 15 to rotate upper arm 15 about shoulder axis 16. Coordinated operation of first and second motors 50 and 52 in conjunction with the mechanical linkage described below causes hand 30 to rotate about shoulder axis 16. A post 84 extends upwardly through bearings encircling the center of a hand pulley 86 that is mounted to a bottom surface 88 of hand 30. An endless belt 90 connects in a 1:2 ratio hand drive pulley 66 to hand pulley 86 to rotate hand 30 about shoulder axis 16 in response to the coordinated rotational motions of first and second motors 50 and 52.

The mechanical linkage coupling upper arm 15 and forearm 22 forms an active drive link and a passive drive link. The active drive link includes endless belt 68 connecting forearm drive pulley 58 and the forearm pulley 62 and causes forearm 22 to rotate in a 1:1 ratio relative to rotation of first motor 50. The passive drive link includes endless belt 90 connecting hand drive pulley 66 and hand pulley 86 and causes hand 30 to rotate about wrist axis 32 in a 1:2 ratio relative to rotation of forearm 22 about elbow axis 24. Rotation of hand 30 can also be caused by a complex interaction among the active and passive drive links and the rotation of upper arm 15 in response to rotation of second motor 52.

A third motor 92 is directly coupled to a bottom surface 94 of torso link 12, to which robot arm mechanism 10 is rotatably mounted. A main ring 96 houses bearings 98 that support the rotation of hollow first spindle 53, second spindle 70, and torso link 12. Third motor 92 is capable of 360-degree continuous rotation about torso axis 14 and can, therefore, in cooperation with robot arm mechanism 10, move hand 30 along an irregular path to any location within the reach of hand 30. This is beneficial because it facilitates specimen processing layouts that have relatively small footprints and processing component placements that enhance ergonomic loading of specimens.

Figure 3:
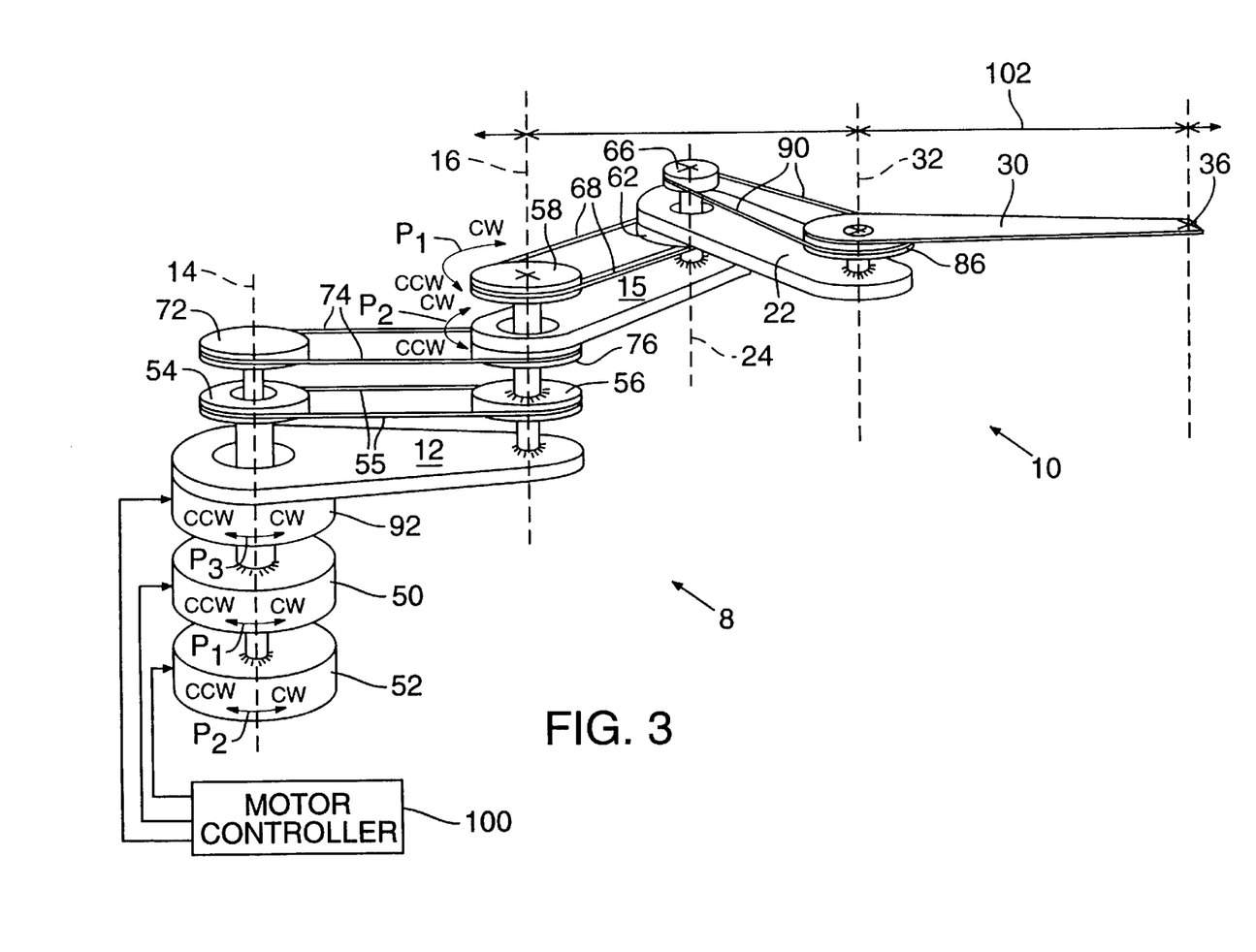
FIG. 3 is an isometric view in conceptual stick diagram form showing the rotational and linear motions imparted by three motors arranged in a triaxial concentric relationship and associated drive links of the robot arm system of FIGS. 1A and 1B.

Referring also to FIG. 3, motor controller 100 controls motors 50, 52, and 92 in at least three preferred operational states to enable robot arm mechanism 10 to perform first and second motion sequences relative to shoulder axis 16 and to enable torso link to perform a third motion sequence relative to torso axis 14. The first motion sequence changes the extension or radial position of hand 30, the second motion sequence changes the angular position of hand 30 relative to shoulder axis 16, and the third motion sequence changes the angular position of torso link 12 relative to torso axis 14.

In the first operational state, motor controller 100 causes third motor 92 to maintain the position of torso link 12 while causing first and second motors 50 and 52 to equally counter-rotate respective first and second drive pulleys 54 and 72. The rotation of first drive pulley 54 couples with a 1:1 ratio through endless belt 55 to rotate hollow forearm drive spindle 56 and forearm drive pulley 58.

The counter-rotation by second motor 52 of second drive pulley 72 couples with a 1:1 ratio through endless belt 74 to counter-rotate, relative to forearm drive pulley 58, hollow upper arm pulley 76 and upper arm 15. The rotation of upper arm 15 relative to the counter-rotation of forearm drive pulley 58 causes rotation of forearm 22 about elbow axis 24 and counter rotation of hand 30 about wrist axis 32. Because the ratio of the diameters of forearm drive pulley 58 and forearm pulley 62 is 1:1 and the ratio of the diameters of hand drive pulley 66 and hand pulley 86 is 1:2, the rotation of upper arm 15 in directions specified by $P_2$ and the counter-rotation of forearm 22 in directions specified by $P_1$ causes fluid pressure outlet 36 of hand 30 to move along a straight line path 102 radial to shoulder axis 16.

As forearm 22 and upper arm 15 counter-rotate in the directions specified respectively by $P_1$, and $P_2$, fluid pressure outlet 36 of hand 30 alternately extends and retracts in radial distance from shoulder axis 16 along straight line path 102. When robot arm mechanism 10 is fully extended as shown in FIG. 1B, axes 16, 24, and 32 are collinear and fluid pressure outlet 36 is at a maximum radial distance from shoulder axis 16. On the other hand, when robot arm mechanism 10 is fully retracted, axes 16 and 32 are collinear.

In the second operational state, motor controller 100 causes first motor 50 to rotate first drive pulley 54 and, by 1:1 ratio coupling through endless belt 55, forearm drive pulley 58 in the directions specified by $P_1$ Motor controller 100 also causes second motor 52 to rotate second drive pulley 72 and, by 1:1 ratio coupling through endless belt 74, hollow upper arm pulley 76 in the directions specified by $P_2$. In the special case in which motors 50 and 52 are synchronized to rotate in the same direction by the same amount of displacement, hand 30 is only angularly displaced about shoulder axis 16. This is so because the rotation of forearm 22 about elbow axis 24 caused by the rotation of first motor 50 and the rotation of hand 30 about wrist axis 32 caused by rotation of second motor 52 and the operation of the passive drive link offset each other to produce no net rotation about elbow axis 24 and wrist axis 32. Thus, hand 30 is fixed radially at a point along path 102 and describes a circular path as upper arm 15 rotates about shoulder axis 16. By application of kinematic constraints to achieve a desired travel path for hand 30, motor controller 100 can operate first and second motors 50 and 52 to move robot arm mechanism 10 along nonradial straight line paths.

In the alternative embodiment employing end effector structure 40 having oppositely extending hands, hand 30A retracts while hand 30B simultaneously extends, and vice versa. In the special cases when hands 30A or 30B are fully retracted, wrist axis 32 is collinear with shoulder axis 16, a 180-degree rotation of robot arm mechanism 10 in the second operational state effects an end-for-end swap of hands 30A and 30B, which is useful in many specimen handling applications, such as the one described with reference to FIG. 8.

In the third operational state, motor controller 100 synchronizes the rotations of motors 50, 52, and 92 to rotate in the same direction and by the same amount of displacement. This causes robot arm mechanism 10 to maintain its angular and radial positions relative to torso link 12 while torso link 12 rotates around torso axis 14 in the directions specified by $P_3$. Of course, motor controller 100 may, independently of the operational states of motors 50 and 52, control the operation of third motor 92 and, therefore, the rotation of torso link 12 in the directions specified by $P_3$. Such independent motor control can lead to very complex movements of hand 30.

Figures 4A, 4B:
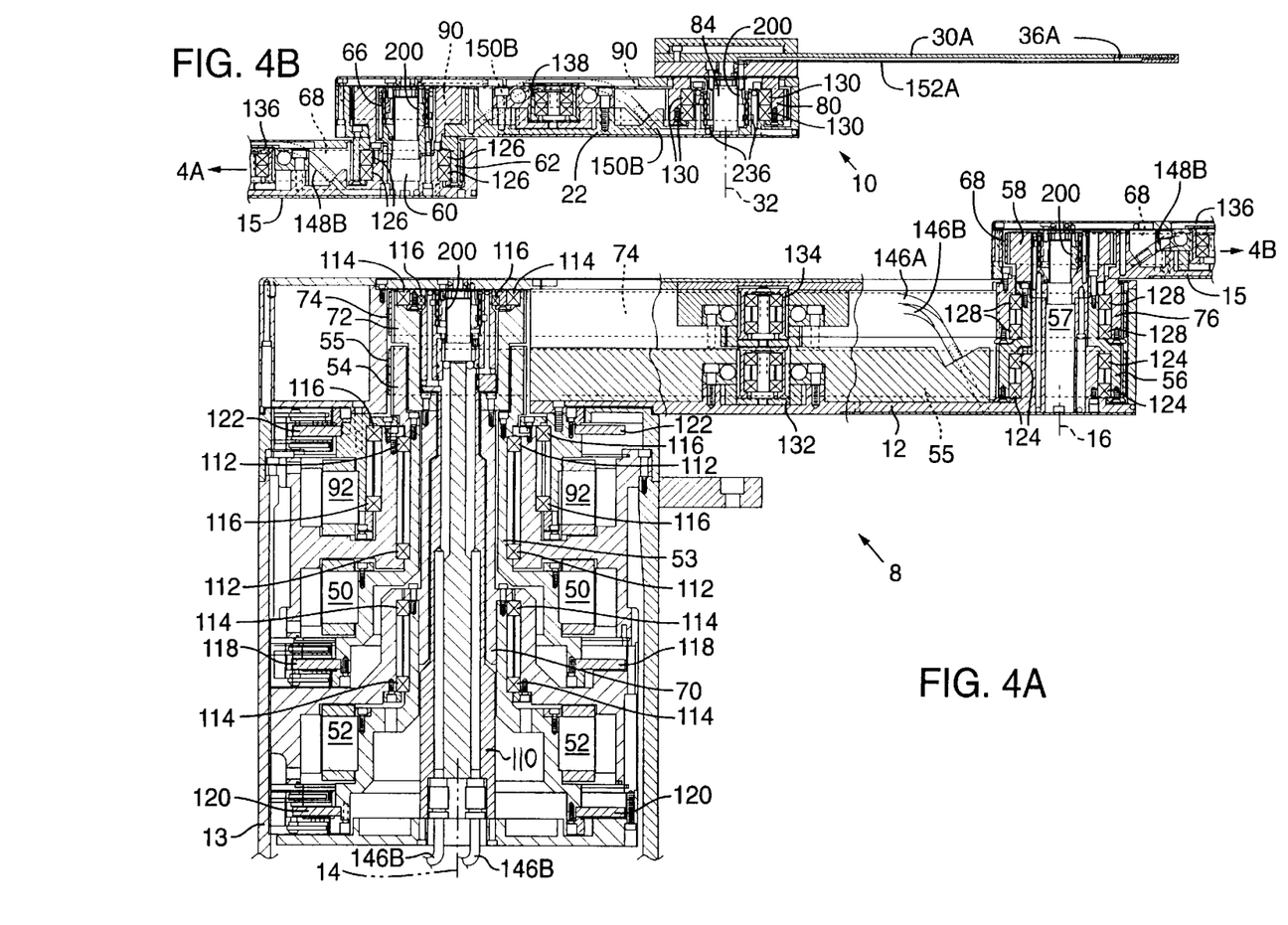
FIGS. 4A and 4B are fragmentary elevation views of the respective base housing/torso link and robot arm mechanism of the robot arm system of FIGS. 1A and 1B sectionally cut away to reveal the interior components, three motors in a triaxial concentric relationship, mechanical linkages, and fluid pressure conduits therein.

FIGS. 4A and 4B show details of the interior components, triaxial motor arrangement, mechanical linkages, and fluid pressure conduits of robot arm system 8. Base housing 13 contains first motor 50, second motor 52, and third motor 92 arranged in triaxial concentric relation such that their respective hollow first spindle 53, second spindle 70, and torso link 12 independently rotate about torso axis 14. Hollow first spindle 53 is journaled for rotation on bearings 112, second spindle 70 is journaled for rotation on bearings 114, and torso link 12 is journaled for rotation on bearings 116. A rigid, nonrotating spine 110 protrudes upwardly along torso axis 14 from the bottom of base housing 13 to provide bearing support for first and second drive pulleys 54 and 72 and for torso link 12.

Unlike prior robot arm arrangements in which the first and second motors were small motors placed near the distal end of a torso link, the triaxial arrangement of this invention places motors 50, 52, and 92 at the proximal end of torso link 12 and allows them to have a large diameter that provides high rotational torque to their respective linkages while displacing their significant motor mass away from distal end 11 of torso link 12. Accordingly, the moment of inertia of robot arm system 10 is reduced and its rotational accelerations are increased.

The angular positions of motors 50, 52, and 92 are tracked by respective glass scale encoders 118, 120, and 122, each of which includes an annular diffraction grating scale and an associated light source/detector subassemblies. Such glass scale encoders are known to skilled persons.

Figures 5A, 5B, 5C:
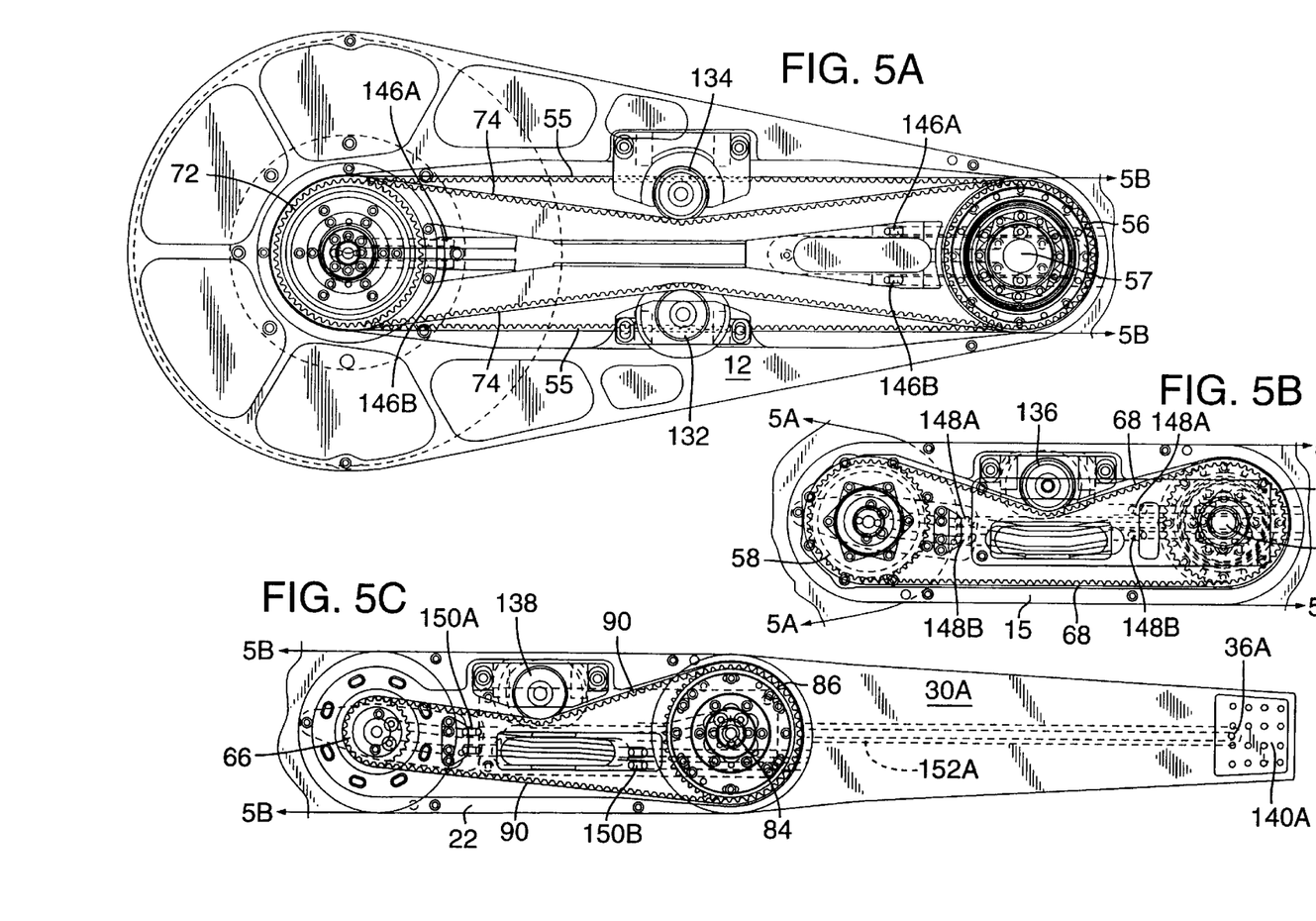
FIGS. 5A, 5B, and 5C are fragmentary plan views of the respective torso link, upper arm, and forearm/hand of the robot arm system of FIGS. 1A and 1B sectionally cut away to reveal the interior components, mechanical linkages, and fluid pressure conduits therein.

Referring also to FIGS. 5A, 5B, and 5C, first motor 50 rotates hollow first spindle 53 and first drive pulley 54 that is coupled by endless belt 55 to hollow forearm drive spindle 56, which is journaled on bearings 124 for rotation about post 57. Hollow forearm drive spindle 56 rotates forearm drive pulley 58, which is housed within upper arm 15. Endless belt 68 couples forearm drive pulley 58 to forearm pulley 62, which is journaled on bearings 126 for rotation about post 60. Forearm pulley 62 rotates forearm 22 about elbow axis 24 in response to rotation of first motor 50.

Second motor 52 rotates second spindle 70 and second drive pulley 72 that is coupled by endless belt 74 to hollow upper arm pulley 76, which is journaled on bearings 128 for rotation about hollow forearm drive spindle 56. Hollow upper arm pulley 76 rotates upper arm 15 about shoulder axis 16 in response to rotation of second motor 52.

Hand drive pulley 66 is rigidly attached to post 60, which is rigidly attached to upper arm 15. Endless belt 90 couples hand drive pulley 66 to hand pulley 86, which is journaled on bearings 130 for rotation about post 84. Hand pulley 86 is coupled to hand 30, which rotates about wrist axis 32.

Third motor 92 directly rotates torso link 12, to which robot arm mechanism 10 is rotatably mounted at shoulder axis 16.

In the preferred embodiment, torso axis 14 and shoulder axis 16 are spaced apart by 252.5 millimeters (9.94 inches), shoulder axis 16 and elbow axis 24 are spaced apart by 133.4 millimeters (5.25 inches), elbow axis 24 and wrist axis 32 are spaced apart by 133.4 millimeters (5.25 inches), and wrist axis 32 and fluid pressure outlet 36 are spaced apart by 190.5 millimeters (7.5 inches). These spacings are suitable for placing, retrieving, and positioning 300-millimeter (12-inch) diameter specimens, such as semiconductor wafers, with robot arm system 8. Of course, many other spacings may be employed to satisfy other applications.

Also in the preferred embodiment, all of the endless belts are cogged belts having teeth spaced apart by 3 millimeters (0.12 inch). Accordingly, all of the pulleys that the belts mesh with are cogged pulleys having mating teeth spaced apart by 3 millimeters. Endless belts 55 and 74 each have 228 teeth and a pitch length of 684 millimeters (26.929 inches), endless belt 68 has 140 teeth and a pitch length of 420 millimeters (16.535 inches), and endless belt 90 has 131 teeth and a pitch length of 393 millimeters (15.472 inches). Endless belts 55, 68, 74, and 90 have slack removed and are suitably tensioned by respective spring biased idler wheels 132, 134, 136, and 138. Of course, many other spacings and lengths may be employed to satisfy other applications.

Further in the preferred embodiment, first drive pulley 54 and hollow forearm drive spindle 56 each have 59 teeth and a 56.34-millimeter (2.218-inch) pitch diameter to form a 1:1 drive ratio. Likewise, second drive pulley 72 and hollow upper arm pulley 76 each have 59 teeth and a 56.34-millimeter (2.218-inch) pitch diameter to form a 1:1 drive ratio. Forearm drive pulley 58 and forearm pulley 62 each have 49 teeth and a 46.8-millimeter (1.842-inch) pitch diameter to form a 1:1 drive ratio. Hand drive pulley 66 has 27 teeth and a 25.8-millimeter (1.015-inch) pitch diameter and hand pulley 86 has 54 teeth and a 51.6-millimeter (2.03-inch) pitch diameter to form a 1:2 drive ratio. Of course, many other diameters, numbers of teeth, and drive ratios may be employed to satisfy other applications provided that motor controller 100 appropriately rotates first, second, and third motors 50, 52, and 92 to achieve the desired hand motions.

Robot arm mechanism 10 has a preferred 1:1:1:2 overall drive ratio, whereas prior robot arm mechanisms employed a 2:1:1:2 drive ratio. The 1:1:1:2 drive ratio is advantageous because it transmits twice the motor torque to robot arm mechanism 10 than does the prior drive ratio. This allows implementation of longer links for an extended reach capability without unduly sacrificing their rotational accelerations.

The 1:1:1:2 drive ratio is also advantageous because the of second motor 52 provides additional torque for imparting motion to robot arm mechanism 10. Moreover, because the prior 2:1:1:2 drive ratio required rotation of only first motor 50 to achieve linear displacement of hand 30, second motor 52 was undriven and had a tendency to rotationally creep. This problem is eliminated by the 1:1:1:2 drive ratio because first and second motors 50 and 52 are both actively driven and controlled.

The 1:1:1:2 drive ratio is further advantageous in the first operational state of motor controller 100 because the counter-rotation of first and second motors 50 and 52 places rotationally-opposing forces on the endless belts, thereby canceling out any belt stretch-related rotational hysteresis and rendering more accurate the movements of hand 30.

However, the 1:1:1:2 drive ratio has a disadvantage that has, until now, discouraged its use. Each rotation of first motor 50 relative to second motor 52 causes two extension and retraction cycles of hand 30. Therefore, when robot arm system 8 is first powered up, it is impossible to determine by sensing glass scale encoders 118 and 120 whether a particular relative directional rotation of motors 50 and 52 will extend or retract hand 30. Indeed, in continuously rotatable robot arm applications, it is impossible for any single revolution encoder to detect this condition. Accordingly, a motion sensor should be employed to determine which directional rotation of first motor 50 relative to second motor 52 is required to extend or retract hand 30. Once robot arm system 8 is so initialized after power up, this rotational ambiguity is no longer a problem.

As shown in FIG. 1C, robot arm mechanism 10 may have substituted for hand 30 alternative end effector structure 40 having two oppositely extending hands 30A and 30B that rotate about wrist axis 32. Because they retrieve and deliver separate specimens, hands 30A and 30B have respective vacuum lands 140A and 140B and fluid pressure outlets 36A and 36B that are connected to separate fluid pressure conduits routed within base housing 13, torso link 12, upper arm 15, forearm 22, and alternative end effector structure 40.

Referring again to FIGS. 4 and 5, base housing 13 includes two separate fluid pressure conduits 142A and 142B enclosed in part within spine 110. Each fluid pressure conduit further includes multiple path segments, with conduit 142A coupling inlet 38 to fluid pressure outlet 36A of vacuum land 140A and conduit 142B coupling inlet 38 to outlet 36B of vacuum land 140B. Although only hand 30A is shown, the description is generally applicable to providing fluid pressure to hand 30B as well. Path segments 144A and 144B of the respective conduits 142A and 142B are flexible hoses leading to vacuum control valves that connect to inlet 38 and are described with reference to FIG. 7. Path segments 146A and 146B in torso link 12, path segments 148A and 148B in upper arm 15, path segments 150A and 150B in forearm 22, and path segments 152A and 152B in respective hands 30A and 30B are combinations of channels formed by complementary depressions in mating components, holes passing through solid components, or flexible hoses.

Fluid pressure outlets 36A and 36B constitute holes in the respective vacuum lands 140A and 140B. Each path segment of conduits 142A and 142B terminating or originating at torso axis 14, shoulder axis 16, elbow axis 24, and wrist axis 32 includes a prior art rotary multiple fluid-passageway spool 200 that functions as two independent vacuum feedthrough conduits that permit continuous rotation about any one of the four axes. The placement of spool 200 fitted in each of the four rotary joints of robot arm system 8 is shown in FIGS. 4A and 4B.

Figure 6A:
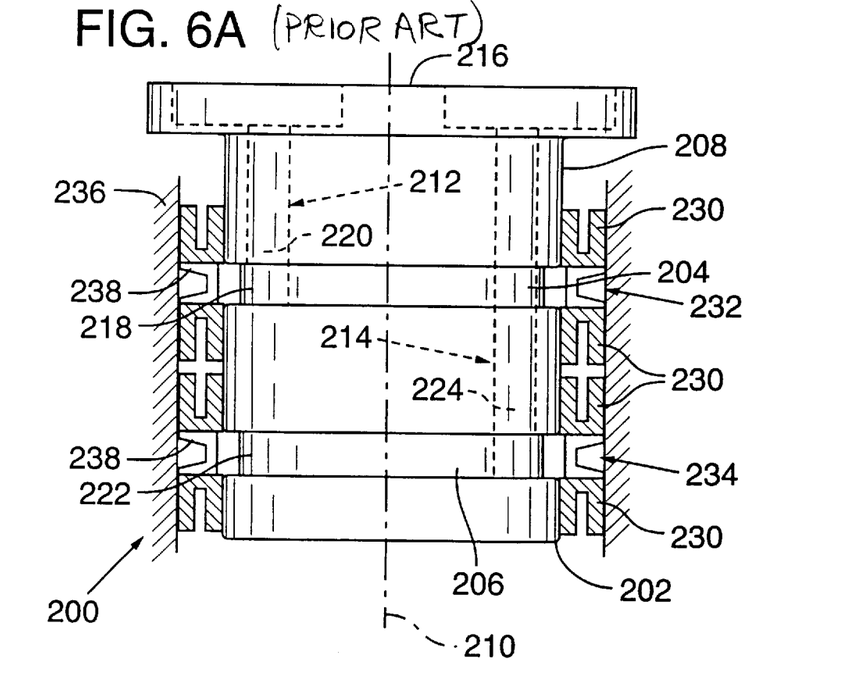
FIGS. 6A and 6B are respective enlarged side elevation and plan views of a prior art rotary multiple fluid-passageway spool installed in each rotary joint of the robot arm system of FIGS. 1A and 1B.
Figure 6B:
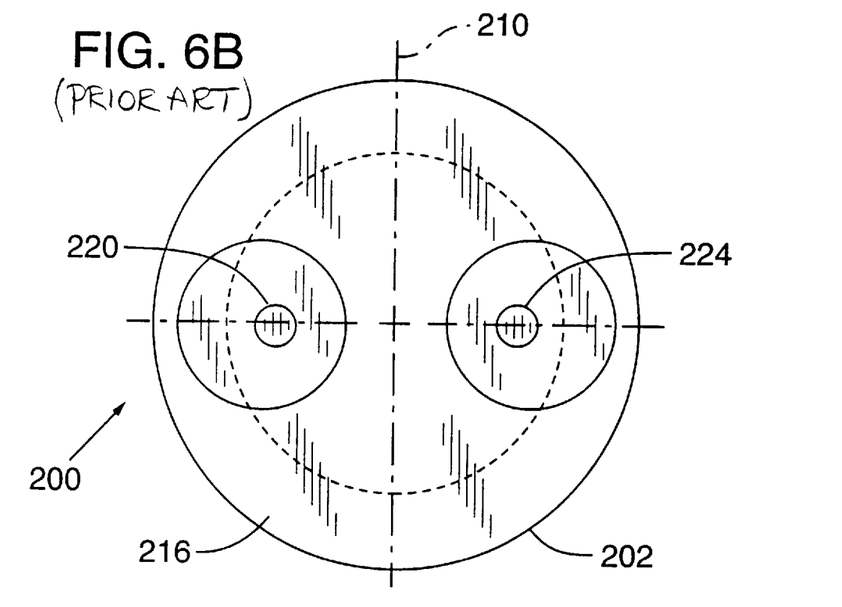

FIGS. 6A and 6B show the design details of rotary multiple fluid-passageway spool 200, which comprises a solid metal cylindrical body 202 having two spaced-apart grooves 204 and 206 formed in and encircling its outer side surface 208 about a longitudinal axis 210. Two separate vacuum pressure delivery channels 212 and 214 are formed within and pass through body 202. Each of channels 212 and 214 has two passageway segments, one originating in a groove and the other terminating at a top surface 216 of body 202. More specifically, for channel 212, a passageway segment 218 extends inwardly from groove 204 in a direction transverse to longitudinal axis 210 and intersects with a passageway segment 220 at a right angle juncture. Passageway segment 220 extends upwardly toward and through top surface 216 in a direction parallel to longitudinal axis 210. Similarly, for channel 214, a passageway segment 222 extends inwardly from groove 206 in a direction transverse to longitudinal axis 210 and intersects with a passageway segment 224 at a right angle juncture. Passageway segment 224 extends upwardly toward and through top surface 216 in a direction parallel to longitudinal axis 210.

For purposes of convenience only, the following describes the operation of spool 200 in the rotary joint defining wrist axis 32. When spool 200 is fitted into post 84 of forearm 22, four seal rings 230 spaced above, between (two seals), and below grooves 204 and 206 form two annular gas spaces 232 and 234 between side surface 208 of spool 200 and an interior surface 236 of forearm 22. Spacers 238 that extend about 330 degrees around spool 200 in grooves 204 and 206 maintain the desired separation between adjacent seal rings 230. Vacuum path segments 150A and 150B terminate in the respective gas spaces 232 and 234 and their corresponding holes in top surface 216 of spool 200, thereby coupling the fluid pressure supply through spool 200 to fluid pressure outlets 36A and 36B.

Figure 7:
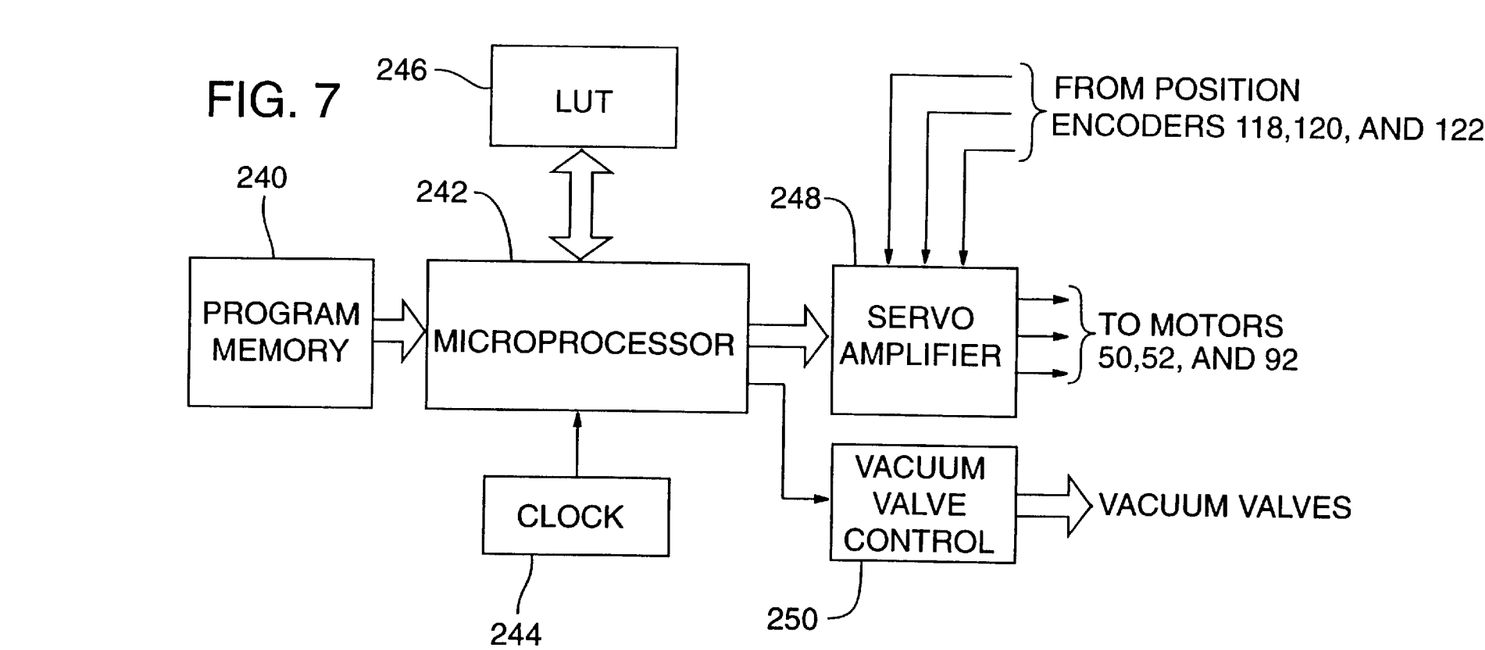
FIG. 7 is an electrical block diagram of a motor controller for driving the motors of the robot arm system of FIGS. 1A and 1B.

FIG. 7 is a simplified block diagram showing the primary components of motor controller 100, which includes a program memory 240 that stores move sequence instructions for robot arm system 8. A microprocessor 242 receives from program memory 240 the move sequence instructions and interprets them to determine whether the first or second operational state is required for positioning robot arm mechanism 10 or whether the third operational state is required to position torso link 12. A system clock 244 controls the operation of microprocessor 242. A look-up table (LUT) 246 stores corresponding rotational values for first and second motors 50 and 52 to accomplish the straight line motion of the first operational state and the angular displacements to accomplish the angular motion of the second operational state. Because the rotation of torso link 12 may be independent of the motions of robot arm mechanism 10 mounted to it, the overall coordination of the angular displacement of third motor 92 with the angular displacements of first and second motors 50 and 52 is carried out in the move sequence instructions, not in LUT 246. This results in higher speed and more accurate straight line motion because multiple axis servomechanism following errors and drive accuracy errors do not affect the straight line path of hand 30.

Microprocessor 242 provides rotational positioning signals to a servo amplifier 248, which delivers corresponding command signals to first, second, and third motors 50, 52, and 92. Servo amplifier 248 receives from glass scale encoders 118, 120, and 122 signals indicative of the angular positions of the respective motors 50, 52, and 92.

Microprocessor 242 also provides control signals to a vacuum valve controller 250, which causes vacuum valves (not shown) to provide from inlet 38 (FIG. 1A) an appropriate amount of vacuum pressure to vacuum pressure conduits 142A and 142B (FIG. 4A) in response to the need to hold a wafer with or release a wafer from hands 30A and 30B.

Figure 8:
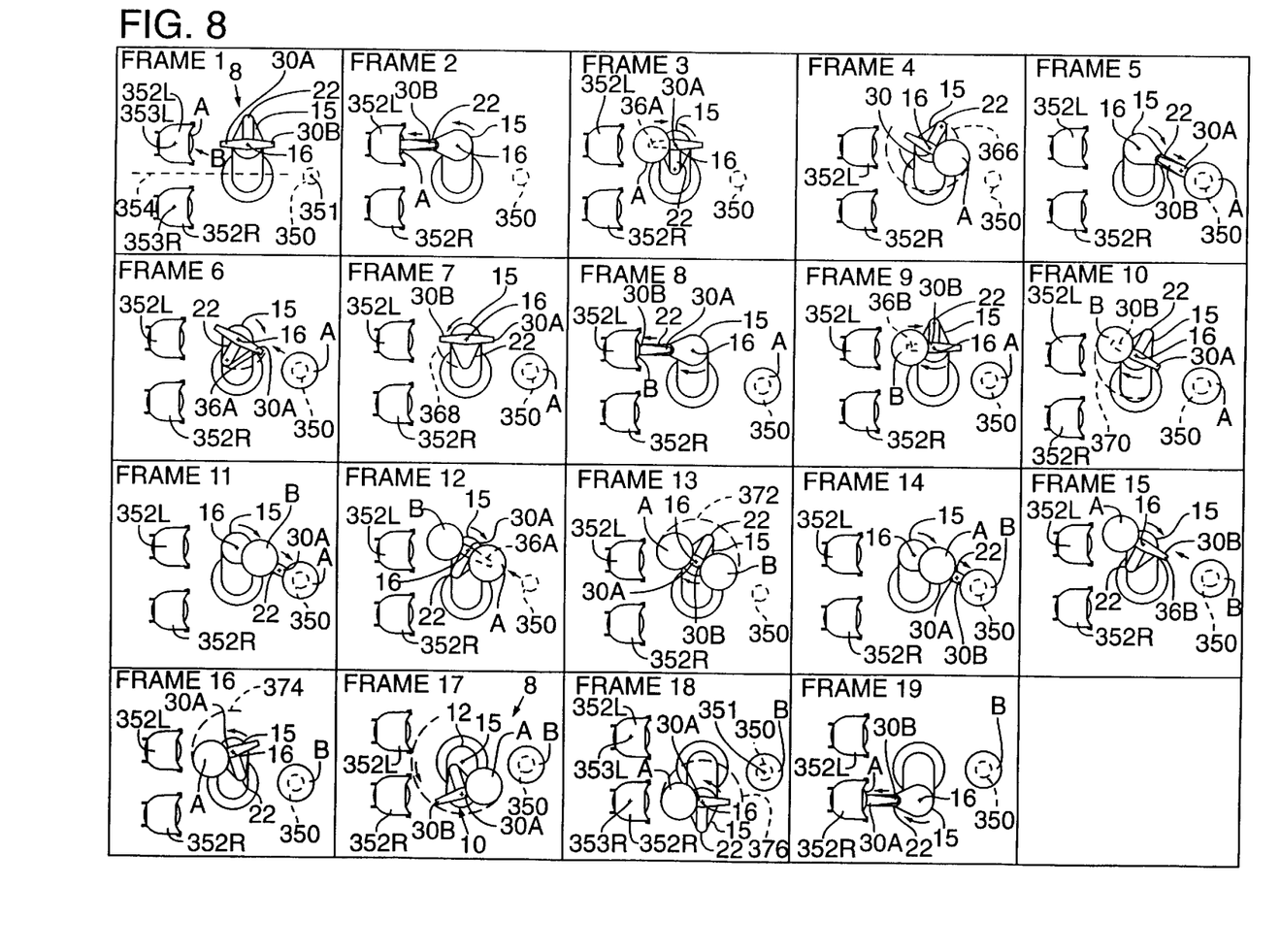
FIG. 8 shows in a series of 19 frames representing the various positions of a multiple link robot arm system like that of FIGS. 1A, 1B, and 1C as it retrieves two specimens from parallel-aligned storage locations and sequentially places the two specimens temporarily at a process location.

FIG. 8 includes 19 frames representing various positions of a robot arm system similar to robot arm system 8 in an exemplary operational sequence that moves a wafer A from a wafer cassette 352L to a processing station 350 and to a wafer cassette 352R, and moves a wafer B from wafer cassette 352L to processing station 350.

In this example, in the initial position shown in frame 1, shoulder axis 16 is radially positioned 45.72 centimeters (18 inches) from an effective center 351 of processing station 350 and an effective center 353L of cassette 352L. As shown in frame 18, shoulder axis 16 is radially positioned 45.72 centimeters (18 inches) from center 351 of processing station 350 and an effective center 353R of cassette 352R. The position of axis 16 in frame 1, the position of axis 16 in frame 18, and centers 353L and 353R define four corners of a rectangle with axes 16 (frame 1) and 16 (frame 18) spaced apart by a distance of 50.5 centimeters (19.88 inches) and cassettes 352L and 352R spaced apart by an equal distance from center to center.

The following description tracks the angular displacement of torso link 12 about torso axis 14, upper arm 15 about shoulder axis 16, and hands 30A and 30B of alternate end effector 40 about wrist axis 32 to demonstrate the continuous rotation capabilities of robot arm system 8.

Frame 1 shows the initial positions of hands 30A and 30B retracted and in line with the opening of cassette 352L, with hand 30A facing in the direction of and nearer than hand 30B to cassette 352L. In these initial positions, the central longitudinal axis of upper arm 15 (i.e., a line connecting axes 16 and 24) is angularly displaced 90 degrees CCW from a reference line 354. Reference line 354 is perpendicular to a line connecting centers 353L and 353R.

Frame 2 shows upper arm 15 and forearm 22 cooperatively rotating in the first operational state of motor controller 100 to linearly extend hand 30A to reach and retrieve wafer A from cassette 352L. To accomplish this incremental movement, upper arm 15 rotated 90 degrees CCW about shoulder axis 16.

Frame 3 shows upper arm 15 and forearm 22 cooperatively rotating in the first operational state of motor controller 100 to linearly retract hand 30A holding wafer A after the application of vacuum pressure at outlet 36A to secure wafer A to hand 30A. To accomplish this incremental movement, upper arm 15 rotated 90 degrees CCW about shoulder axis 16.

Frame 4 shows upper arm 15 rotating 153.65 degrees CCW along a circular path segment 366 about shoulder axis 16 in the second operational state of motor controller 100 to keep hand 30A retracted while holding wafer A, hold forearm 22 stationary, and position hand 30A in line with processing station 350.

Frame 5 shows upper arm 15 and forearm 22 cooperatively rotating in the first operational state of motor controller 100 to linearly extend hand 30A to reach and place wafer A on processing station 350. To accomplish this incremental movement, upper arm 15 rotated 90 degrees CW about shoulder axis 16.

Frame 6 shows upper arm 15 and forearm 22 cooperatively rotating in the first operational state of motor controller 100 to linearly retract hand 30A after the release of vacuum pressure at outlet 36A to leave wafer A at processing station 350. To accomplish this incremental movement, upper arm 15 rotated 90 degrees CW about shoulder axis 16.

Frame 7 shows upper arm 15 rotating 26.35 degrees CCW along a circular path segment 368 about shoulder axis 16 in the second operational state of motor controller 100 to keep hand 30B fully retracted, hold forearm 22 stationary, and position hand 30B in line with cassette 352L.

Frame 8 shows upper arm 15 and forearm 22 cooperatively rotating in the first operational state of motor controller 100 to linearly extend hand 30B to retrieve wafer B from cassette 352L. To accomplish this incremental movement, upper arm 15 rotated 90 degrees CW about shoulder axis 16.

Frame 9 shows upper arm 15 and forearm 22 cooperatively rotating in the first operational state of motor controller 100 to linearly retract hand 30B holding wafer B after the application of vacuum pressure at outlet 36B to secure wafer B to hand 30B. To accomplish this incremental movement, upper arm 15 rotated 90 degrees CW about shoulder axis 16.

Frame 10 shows upper arm 15 rotating 26.35 degrees CW along a circular path segment 370 about shoulder axis 16 in the second operational state of motor controller 100 to keep hand 30B fully retracted while holding wafer B, hold forearm 22 stationary, and position hand 30A in line with and nearer than hand 30B to processing station 350.

Frame 11 shows upper arm 15 and forearm 22 cooperatively rotating in the first operational state of motor controller 100 to linearly extend hand 30A to reach and retrieve wafer A from processing station 350. To accomplish this incremental movement, upper arm 15 rotated 90 degrees CW about shoulder axis 16.

Frame 12 shows upper arm 15 and forearm 22 cooperatively rotating in the first operational state of motor controller 100 to linearly retract hand 30A holding wafer A after the application of vacuum pressure at outlet 36A to secure wafer A to hand 30A. To accomplish this incremental movement, upper arm 15 rotated 90 degrees CW about shoulder axis 16.

Frame 13 shows upper arm 15 rotating 180 degrees CW (or CCW) along a circular path segment 372 about shoulder axis 16 in the second operational state of motor controller 100 to keep hand 30A fully retracted while holding wafer A, hold forearm 22 stationary, and position hand 30B in line with processing station 350.

Frame 14 shows upper arm 15 and forearm 22 cooperatively rotating in the first operational state of motor controller 100 to linearly extend hand 30B to reach and place wafer B on processing station 350. To accomplish this incremental movement, upper arm 15 rotated 90 degrees CW about shoulder axis 16.

Frame 15 shows upper arm 15 and forearm 22 cooperatively rotating in the first operational state of motor controller 100 to linearly retract hand 30B after the release of vacuum pressure at outlet 36B to leave wafer B at processing station 350. To accomplish this incremental movement, upper arm 15 rotated 90 degrees CW about shoulder axis 16. Upon completion of the incremental movements shown in frames 8–15, upper arm 15 underwent a continuous 746.35-degree cycle of CW rotation without any CCW rotation.

Frame 16 shows upper arm 15 rotating 45 degrees CCW along a circular path 374 about shoulder axis 16 in the second operational state of motor controller 100 to keep hand 30A fully retracted while holding wafer A and hold forearm 22 stationary.

Frame 17 shows robot arm system 8 cooperatively rotating in the third operational state of motor controller 100 to rotate torso link 12 and robot arm mechanism 10 180 degrees CW (or CCW) about torso axis 14 to position hand 30B adjacent to cassette 352R and hand 30A adjacent to, but facing a direction opposite from, cassette 352R.

Frame 18 shows upper arm 15 rotating 161.35 degrees CCW along a circular path 376 about shoulder axis 16 in the second operational state of motor controller 100 to keep hand 30A fully retracted, hold forearm 22 stationary, and position hand 30A in line with cassette 352R.

Frame 19 shows upper arm 15 and forearm 22 cooperatively rotating in the first operational state of motor controller 100 to linearly extend hand 30A to reach and place wafer A in cassette 352R. To accomplish this incremental movement, upper arm 15 rotated 90 degrees CW about shoulder axis 16.

In this example, upper arm 15 underwent bidirectional rotational movement and completed a continuous 746.35-degree CW cycle about shoulder axis 16 without any CCW rotation. Torso link 12 underwent rotational movement and completed a continuous 180-degree cycle about torso axis 12 without any counter-rotation.

Robot arm system 8 provides extended reach in that all links can be serially extended. To match the same length of extension, a conventional three-link robot arm mechanism would require a much greater footprint because of a limited ability to collapse its length. Moreover, there are geometrical limits to a reacharound capability with conventional three-link robot arm mechanisms, which perform linear moves by following a path defined by the radial line connecting the shoulder axis to the end of the hand. This invention is capable of performing linear moves without following a radial path.

It will be obvious to those having skill in the art that many changes may be made to the details of the above-described embodiments of this invention without departing from the underlying principles thereof. The scope of the present invention should, therefore, be determined only by the following claims.

We claim:

1. A multiple link robot arm system, comprising:
   a torso link operable for rotation about a torso axis and extending between the torso axis and a shoulder axis that is offset from the torso axis;
   a robot arm mechanism comprising an upper arm supported by the torso link for rotation about the shoulder axis and extending between the shoulder axis and an elbow axis, a forearm supported by the upper arm for rotation about the elbow axis and extending between the elbow axis and a wrist axis, and a hand supported by the forearm for rotation about the wrist axis:
   a first motor having a first motor spindle coaxial with and rotatable about the torso axis for rotatably positioning the forearm about the elbow axis;
   a second motor having a second motor spindle coaxial with and rotatable about the torso axis for rotatably positioning the upper arm about the shoulder axis; and a third motor having a third motor spindle coaxial with and rotatable about the torso axis for rotatably positioning the torso link about the torso axis.

2. The robot arm system of claim 1 in which the first, second, and third motor spindles are arranged in a concentric relationship along a portion of the common axis.

3. The robot arm system of claim 1 in which each of the first, second, and third motor spindles is journaled for rotation on bearings mounted on a common mechanical structure.

4. The robot arm system of claim 1 further including a first mechanical linkage operatively connecting the upper arm and the forearm, the first mechanical linkage forming an active drive link between the first motor spindle and the forearm to cause the forearm to rotate about the elbow axis in response to operation of the first motor and a passive drive link between the forearm and the hand to cause the hand to rotate about the wrist axis in response to rotation of the forearm about the elbow axis.

5. The robot arm system of claim 4 further including a second mechanical linkage operatively connecting the first motor spindle to the first mechanical linkage.

6. The robot arm system of claim 1 further including a mechanical linkage operatively connecting the second motor spindle and the upper arm to cause the upper arm to rotate about the shoulder axis in response to operation of the second motor.

7. The robot arm system of claim 1 in which the third motor spindle is directly mechanically connected to the torso link.

8. The robot arm system of claim 1 in which the torso link, upper arm, forearm, and hand constitute link elements through which a fluid pressure conduit passes to deliver vacuum pressure to releasibly secure a specimen to the hand; the torso axis, shoulder axis, elbow axis, and wrist axis define rotary joints through which the fluid pressure conduit passes; and at least one of the rotary joints is fitted with a rotary fluid spool that has an aperture through which vacuum pressure is delivered and that has a vacuum pressure seal at an interface between the link elements forming the rotary joint into which the slip ring is fitted.

9. The robot arm system of claim 1, further comprising a controller coordinating the operation of the first, second, and third motors in at least first, second, and third states, and in which the first state is characterized by counter-rotating the first and second motor spindles and holding stationary the third motor spindle to cause linear displacement of the hand.

10. The robot arm system of claim 1, further comprising a controller coordinating the operation of the first. second, and third motors in at least first, second, and third states, and in which the second state is characterized by operating the first and second motor spindles and holding stationary the third motor spindle to cause angular displacement of the hand about the shoulder axis.

11. The robot arm system of claim 1, further comprising a controller coordinating the operation of the first, second, and third motors in at least first, second, and third states, and in which the third state is characterized by operating the first, second, and third motor spindles to change an angular position of the hand about the torso axis.

12. The robot arm system of claim 1 in which the hand comprises one of two oppositely extending first and second hands of an end effector structure that is operable for rotation about the wrist axis.

13. The robot arm system of claim 12 which the torso link, upper arm, forearm, and hand constitute link elements through which first and second fluid pressure conduits pass to deliver vacuum pressure to releasably secure respective first and second specimens to the respective first and second hands; the torso axis, shoulder axis, elbow axis, and wrist axis define rotary joints through which the first and second fluid pressure conduits pass; and at least one of the rotary joints is fitted with a rotary fluid spool that has first and second apertures through which vacuum pressure is delivered and that has a vacuum pressure seal at an interface between the link elements forming the rotary joint into which the slip ring is fitted.

14. A multiple robot arm mechanism including a linkage coupling mechanism driven by multiple motors, comprising:

first, second, and third motors having respective first, second, and third motor spindles all of which positioned to turn about a common axis;

a linkage coupling mechanism comprising first, second, and third driven rotary elements operatively coupled to respective first, second, and third drive mechanisms;

the first drive mechanism coupling the first motor spindle to the first driven rotary element to enable it to turn about a first rotary axis, the second drive mechanism coupling the second motor spindle to the second driven rotary element to enable it to turn about a second rotary axis, and the third drive mechanism coupling the third motor spindle to the third driven rotary element to enable it to turn about a third rotary axis; and the linkage coupling mechanism being configured to have multiple ones of the first, second, and three rotary axes positioned out of alignment with the common axis and thereby cooperate with the positioning of the first, second, and third motor spindles to provide a robot arm mechanism with motor spindle inertia aggregated at the common axis.

15. The robot arm mechanism of claims 14 in which the first, second, and third motor spindles are positioned in concentric relationship along a portion of the common axis.

16. The robot arm mechanism of claim 14 in which each of the first, second, and third spindles is journaled for rotation on bearings mounted on a common structure.

17. The robot arm mechanism of claim 14 in which the linkage coupling mechanism includes a torso link that provides mechanical support for the first, second, and third driven rotary elements, and in which one of the first, second, and third motor spindles is directly coupled to the torso link.

18. The robot arm mechanism of claim 14 in which one of the first, second, and third drive mechanisms includes a gear or a belt.

19. The robot arm mechanism of claim 14 in which one of the first, second, and third driven rotary elements includes a pulley.

* * * * *

UNITED STATES PATENT AND TRADEMARK OFFICE
CERTIFICATE OF CORRECTION

PATENT NO. : 6,105,454
DATED : August 22, 2000
INVENTOR(S) : Paul Bacchi and Paul S. Filipski It is certified that error appears in the above-indentified patent and that said Letters Patent is hereby corrected as shown below:

Column 1, line 7, "08/500,489." should read --08/500,489,--, and "10." should read --10,--.

Column 2, lines 42 and 43, "patent application Ser. No. 5,765,444, filed Jul. 10, 1995," should read --patent No. 5,765,444--.

Column 5, line 3, "highspeed" should read --high-speed--.

Column 7, line 57, "P$_1$," should read --P$_1$--.

Column 8, line 1, "P$_1$ Motor" should read --P$_1$. Motor--.

Column 14, line 61, in claim 1 "axis:" should read --axis;--.

Column 15, line 49, in claim 10 "first." should read --first,--.

Column 16, line 5, in claim 13 "12 which" should read --12 in which--.

Column 16, line 18, in claim 14 "A multiple robot" should read --A robot--.

Column 16, line 41, in claim 15 "claims" should read --claim--.

Signed and Sealed this

Twenty-fourth Day of April, 2001

Attest:

NICHOLAS P. GODICI

Attesting Officer

Acting Director of the United States Patent and Trademark Office